United States Patent
Zeng

(10) Patent No.: US 9,319,822 B2
(45) Date of Patent: Apr. 19, 2016

(54) OVER-THE-AIR UPDATE METHOD FOR CONTINUOUS DELTA OF AN ANDROID OPERATING SYSTEM OF A HANDHELD DEVICE

(71) Applicant: GUANG DONG OPPO MOBILE TELECOMMUNICATIONS CORP., LTD., Guangdong (CN)

(72) Inventor: Yuanqing Zeng, Guangdong (CN)

(*) Notice: Subject to any disclaimer, the term of this patent is extended or adjusted under 35 U.S.C. 154(b) by 204 days.

(21) Appl. No.: 14/007,981

(22) PCT Filed: Sep. 28, 2012

(86) PCT No.: PCT/CN2012/082359
§ 371 (c)(1),
(2) Date: Sep. 27, 2013

(87) PCT Pub. No.: WO2013/149460
PCT Pub. Date: Oct. 10, 2013

(65) Prior Publication Data
US 2014/0066040 A1   Mar. 6, 2014

(30) Foreign Application Priority Data
Apr. 1, 2012   (CN) .......................... 2012 1 0096378

(51) Int. Cl.
*H04W 4/00*   (2009.01)
*G06F 9/445*   (2006.01)

(52) U.S. Cl.
CPC *H04W 4/001* (2013.01); *G06F 8/65* (2013.01)

(58) Field of Classification Search
CPC ........ G06F 8/68; G06F 11/1433; G06F 8/665
USPC .......................... 717/168–170; 455/418–419
See application file for complete search history.

(56) References Cited

U.S. PATENT DOCUMENTS

| | | | | |
|---|---|---|---|---|
| 6,836,657 | B2 * | 12/2004 | Ji et al. .......................... | 455/419 |
| 8,745,612 | B1 * | 6/2014 | Semenzato et al. ........... | 717/170 |
| 2010/0325622 | A1 * | 12/2010 | Morton ......................... | 717/168 |
| 2013/0125107 | A1 * | 5/2013 | Bandakka et al. ............ | 717/171 |

* cited by examiner

*Primary Examiner* — William Nealon
(74) *Attorney, Agent, or Firm* — Prakash Nama; Global IP Services, PLLC

(57) ABSTRACT

An over-the-air update method for continuous delta of an Android handheld device is provided, having advantages of transmitting a plurality of update packages, rebooting once to complete all updates after the update packages are executed, and meeting the update power failure recovery requirement. A command document is continuously processed from the interrupt row according to update information and processing progress after rebooting in cases of abnormal power failure in the update process. In addition, an update power failure recovery method for an Android handheld device is provided. Rebooting is only required once no matter how many update packages are installed. Obstacle to release of a plurality of packages does not exist. The plurality of update packages are provided with update power failure protection. Processing is convenient and realization is reliable.

8 Claims, 1 Drawing Sheet

OVER-THE-AIR UPDATE METHOD FOR CONTINUOUS DELTA OF AN ANDROID OPERATING SYSTEM OF A HANDHELD DEVICE

BACKGROUND OF THE INVENTION

The present invention relates to mobile communication and smart cell phones, specifically to an over-the-air (OTA) method for continuous delta of an ANDROID operating system of a handheld device.

At present, ANDROID operating system is required to be rebooted every time an update package is installed. Correspondingly, OTA update usually adopts delta update packages in view of web velocity, flow price, etc. The delta update package has a small document, but is only suitable for designated versions. In the prior art, only two methods are suitable for providing all users with update if a plurality of versions have been released. One is to release a plurality of delta packages on the basis of every released version to match with any version that may exist in the users' handheld devices. The other is to update progressively time by time, update to the next version each time, reboot once each time updated, and reboot the last version after multiple times of update. Both the two methods have defects. The first method needs too many delta packages for releasing the new version each time and brings inconvenience to management of the update server and compiling by the development personnel. The second method greatly lowers the user experience when users update devices. So, it is an urgent need to provide a method for completing all updates through one-time rebooting. However, such method does not exist or is not disclosed at present.

In addition, such method has the following technical problems: (1) the update command is transmitted between the OTA application and the update mode (Recovery mode) of the ANDROID operating system through the command document, and only commands meeting specifications can be identified; (2) the existing Recovery mode needs to reboot the system once every time installing an update packages, so the update operation and the operation of restoring factory setting can only be executed at most once each time; (3) the command string of the update information of the existing ANDROID operating system update saved in the reserved zone (MISC zone) meets the update power failure recovery requirements of installing an update package once each time, but fails to meet the update power failure recovery requirements of installing a plurality of update packages. Any solution without the ANDROID operating system mechanism that avoids the above three technical problems inevitably effects the use security of the system and even causes system breakdown in serious cases.

BRIEF SUMMARY OF THE INVENTION

The technical problem to be solved by the present invention is to provide an over-the-air update method for continuous delta of an ANDROID operating system of a handheld device. By the method, a plurality of update packages can be transmitted at one time, and one-time rebooting can complete all updates after the packages are completely executed. The method also can meet the requirements for update power failure recovery.

The technical problem of the present invention is solved in the following way. An over-the-air update method for continuous delta of an ANDROID operating system of a handheld device is provided, comprising the following steps:

101) sending the current version of the handheld device to a server by over-the-air update application of the handheld device; judging update packages suitable for the handheld device according to the existing version on the server and feeding back the update packages to the over-the-air update application by the server; writing in a command document according to the feedback information by the over-the-air update application, wherein the command document includes rows of update commands with respective built-in update package paths, and the update packages are arrayed from the top down in the rows in a front-to-back update sequence;

102) rebooting the handheld device to enter update mode;

103)-107) reading rows by rows from the top down and processing commands in turn from the first row to the last row in the command document, wherein the processing process comprises the storage row processing progress in the update information of the misc zone; and, 108) rebooting the handheld device to enter the updated ANDROID operating system.

According to the over-the-air update method for continuous delta of an ANDROID operating system of a handheld device provided by the invention, in steps 103-107), in cases of abnormal power failure, the command document is continuously processed from the interrupt row according to the update information and the row processing progress after restarting.

According to the over-the-air update method for continuous delta of an ANDROID operating system of a handheld device provided by the invention, the processing progress includes, but is not limited to: (1) the currently updating command string in the update information or non-existence of the currently updating command string in the update information; or (2) recording the processing progress through recording the row number.

According to the over-the-air update method for continuous delta of an ANDROID operating system of a handheld device provided by the present invention, the ANDROID operating system of the handheld device performs update power failure recovery in a process including the following steps:

401) reading commands from the command document, reading the update information saved in the misc zone, acquiring the currently updating command string therein;

402) selecting the first row of commands as the interrupt row and entering step 404) if the currently updating command string does not exist, otherwise entering the next step;

403) comparing commands read row by row from the command document with the currently updating command string until the commands read row by row from the command document are identical to the currently updating command string, and selecting this row of commands as the interrupt row;

404) reading and processing commands in turn from the top down from the interrupt row to the last row in the command document, wherein the processing process comprises the saved row processing progress in the update information of the misc zone; and, 405) rebooting the handheld device to enter the updated ANDROID operating system.

According to the over-the-air update method for continuous delta of an ANDROID operating system of a handheld device provided by the present invention, the command document may also include a delete user data command located in the last row in the document or may not have the delete user data command.

According to the over-the-air update method for continuous delta of an ANDROID operating system of a handheld device provided by the present invention, steps 103)-107) comprise reading each row of commands in the command document, outputting the commands into corresponding array variables, and operating an array pointer to, from the variables corresponding to the first row of commands, process variables corresponding to each row of commands row by row from the top down.

The over-the-air update method for continuous delta of the ANDROID operating system of a handheld device provided by the present invention comprises the following steps:

101) sending the current version of the handheld device to a server by over-the-air update application of the handheld device; judging update packages suitable for the handheld device according to the existing version on the server and feeding back the update packages to the over-the-air update application by the server; writing in a command document according to the feedback information by the over-the-air update application, wherein the command document includes rows of update commands with respective built-in update package paths, and the update packages are arrayed from the top down in the rows in a front-to-back update sequence;

102) rebooting the handheld device to enter update mode;

103) opening the command document;

104) reading commands of each row in the command document into arrays in turn from the top down, setting the current array pointer to 0, and closing the command document;

105) executing commands in the array variable corresponded by the current array pointer, adding 1 to the current array pointer;

106) judging if the current array pointer is END? if so, entering step 108), and if not, entering the next step;

107) recording the command string saved by the current array variable in the update information of the misc zone; returning to step 105); and, 108) rebooting the handheld device to enter the updated ANDROID operating system.

The technical problem of the present invention is solved in the following way. An over-the-air update method for continuous delta of an ANDROID operating system of a handheld device is provided, comprising the following steps:

801) sending the current version of the handheld device to a server by over-the-air update application of the handheld device; judging update packages suitable for the handheld device according to the existing version on the server and feeding back the update packages to the over-the-air update application by the server; writing in a command document according to the feedback information by the over-the-air update application, wherein the command document includes rows of update commands with respective built-in update package paths, and the update packages are arrayed from the top down in the rows in a front-to-back update sequence;

802) rebooting the handheld device to enter update mode;

803) reading rows by rows from the bottom up and processing commands in turn to the first row in the command document, wherein the processing process comprises the saved row processing progress in the update information of the misc zone; and, 804 rebooting the handheld device to enter the updated ANDROID operating system.

The over-the-air update method for continuous delta of the Android handheld device provided by the present invention is improvement within the existing ANDROID operating system frame and has the following advantages in comparison with the prior art:

1. rebooting once no matter how many update packages are installed;

2. being free to release a plurality of corresponding update packages;

3. providing update power failure protection for a plurality of update packages;

4. simple processing, reliable realization, no effect on security and use of ANDROID operating system.

BRIEF DESCRIPTION OF THE DRAWINGS

The present invention is described in further detail with the reference to drawings and embodiments in combination.

DETAILED DESCRIPTION OF THE INVENTION

Figure 1:
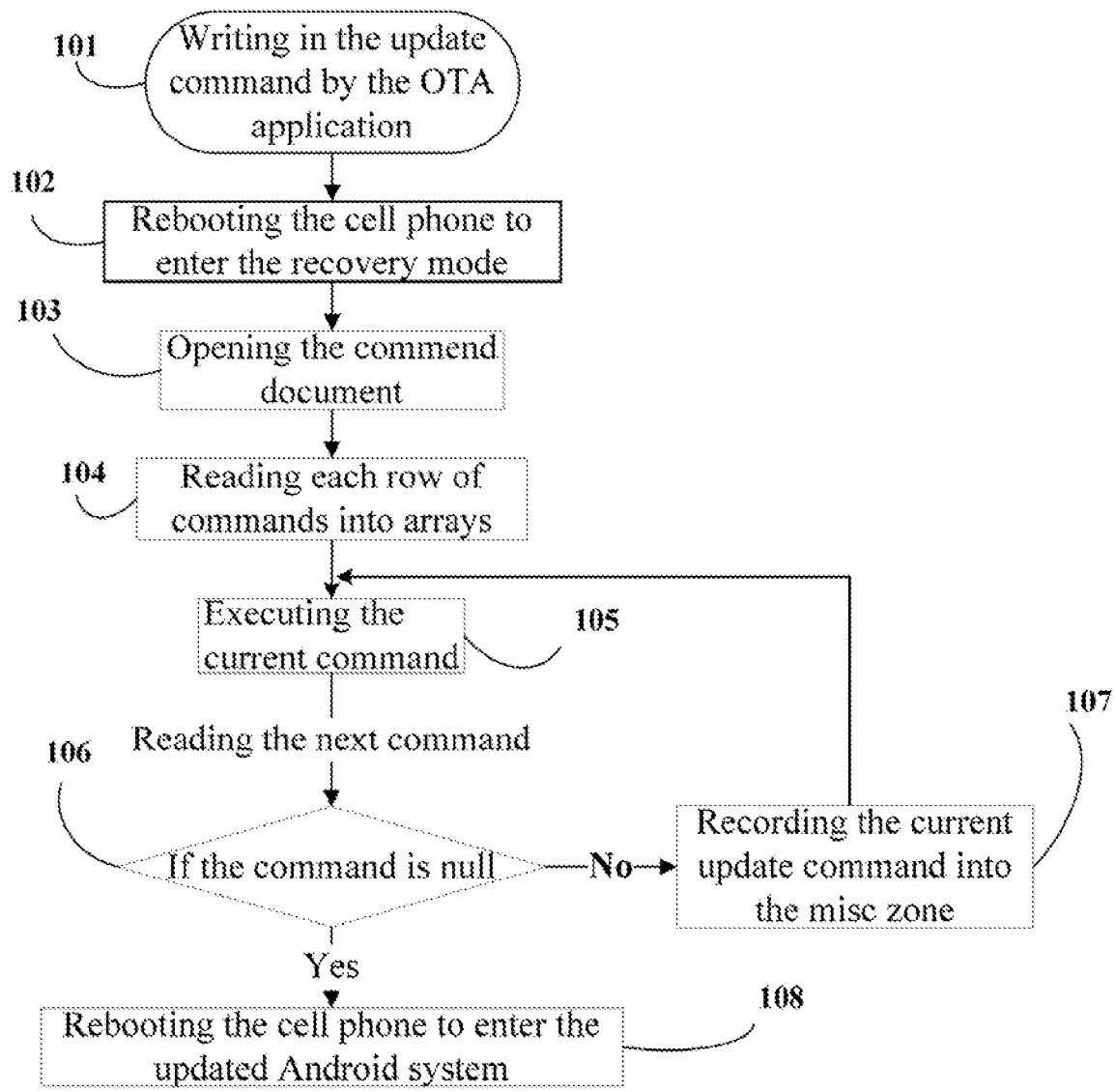
FIG. 1 is a procedure flowchart of command document processing in an update mode by a touch screen smart cell phone in a specific embodiment of the present invention.

First, explain the basis of the invention.

(1) Rewrite the command document written in by the OTA application a) Only support one original command with contents similar to "—update_package=/sdcard/update.zip"

b) The modified command document can support simultaneous update of a plurality of update packages, and the command contents are similar to —update_package=/sdcard/update1.zip
—update_package=/sdcard/update2.zip
—update_package=/sdcard/update3.zip
—update_package=/sdcard/update4.zip"

In cases of delete user data update, the command "—wipe_data "is located in the last row.

(2) Rewrite the update information structure:

a) The following are the original:

```
struct bootloader_message {
    char command[32];
    char status[32];
    char recovery[1024]
};
``` b) The following are the modified:

```
struct bootloader_message {
    char command[32];
    char status[32];
    char recovery[1024];
    char running_command[128];
};
```

Add a row of char running_command[128] for recording the currently updating command string.

(3) Update power failure recovery

The method uses char running_command[128], specifically comprising the following steps:

a) reading commands from the command document, and then reading bootloader_message saved in the misc zone, wherein the running_command command string is the command string being executed when the previous update goes wrong;

1) if the running_command command string does not exist, this means it is first time of update, skipping to b;

2) if the running_command command string exists, this means abnormal power failure occurred before; comparing the read commands with the currently updating command; if the read command is different from the currently updating command, this means this command has updated; starting to read commands in the next row, and repeating process a;

3) if the running_command command string is identical to the read command, this means that the read command is the right executed command in the previous time, skipping to b;

b) saving the read command in the misc zone;
c) starting to execute the read command;
d) deleting the save command;
e) update completed, rebooting.

Second, describe the core and key of the present invention with reference to the embodiment.

As shown in FIG. 1, a touch screen smart cell phone in this embodiment of the present invention updates in a process specifically comprising the following steps:

101) sending the current version of the handheld device to a server by over-the-air update application of the handheld device; judging update packages suitable for the handheld device according to the existing version on the server and feeding back the update packages to the over-the-air update application by the server; writing in a command document according to the feedback information by the over-the-air update application, wherein the command document includes rows of update commands with respective built-in update package paths, and the update packages are arrayed from the top down in the rows in a front-to-back update sequence;

102) re-starting the handheld device to enter update mode;

103) opening the command document;

104) reading commands of each row in the command document into arrays in turn from the top down, setting the current array pointer to 0, and closing the command document;

105) executing commands in the array variable corresponded by the current array pointer, adding 1 to the current array pointer;

106) judging if the current array pointer is END?, if so, entering step 108), and if not, entering the next step;

107) recording the command string saved by the current array variable in the update information of a misc zone; returning to step 105); and,

108) re-starting the handheld device to enter the updated ANDROID operating system.

All in all, the above embodiments are only preferable embodiments of the present invention, and all equivalent changes and modifications made on the concept of the present invention shall belong to the protective scope of the present invention.

What is claimed is:

1. An over-the-air update method for continuous delta of an ANDROID operating system of a handheld device, characterized by comprising the following steps:

step 1: sending a current version of the ANDROID operating system of the handheld device to a server by using an over-the-air update application of the handheld device; judging update packages suitable for updating the ANDROID operating system of the handheld device based on existing versions on the server and then feeding back the suitable update packages to the over-the-air update application by using the server; writing in a command document by using the over-the-air update application according to feedback information from the server, wherein the command document includes rows of update commands with respective built-in update package paths, and the update packages are arrayed from top to bottom in the rows according to update sequence;

step 2: rebooting the handheld device to enter update mode;

step 3: opening the command document;

step 4: performing a processing process which comprises reading and processing the update commands in the rows row by row from top to bottom and saving row's processing progress in update information of a MISC zone of the ANDROID operating system; and, step 5: rebooting the handheld device to start an updated ANDROID operating system;

said reading and processing of the update commands in the rows row by row from top to bottom in step 4 comprise reading each row of the update commands in the command document, outputting the update commands into corresponding array variables, and operating an array pointer to process array variables corresponding to each row of update commands row by row from top to bottom starting from a first row of the corresponding array variables.

2. The over-the-air update method for continuous delta of an ANDROID operating system of a handheld device according to claim 1,
wherein the processing progress refers to a currently updating command string in the update information or non-existence of the currently updating command string in the update information.

3. The over-the-air update method for continuous delta of an ANDROID operating system of a handheld device according to claim 2,
wherein when power failure occurs during the processing process and thus causes an interruption of the processing process, the ANDROID operating system of the handheld device restarts the processing process and then performs update power failure recovery to continuously process the command document from an interrupted row according to the update information and the row's processing progress; the update power failure recovery comprises the following steps:

reading the update commands from the command document, reading the update information saved in the MISC zone, acquiring the currently updating command string therein;

selecting a first row of the update commands as the interrupted row—when the currently updating command string does not exist; or when the currently updating command string exists and is acquired, reading the update commands in the command document row by row and comparing each row with the currently updating command string until a corresponding row is identical to the currently updating command string, and then selecting this corresponding row as the interrupted row;

reading and processing the update commands from top to bottom starting from the interrupted row.

4. The over-the-air update method for continuous delta of an ANDROID operating system of a handheld device according to claim 1,
wherein the command document also comprises a delete user data command located in a last row of the command document.

5. The over-the-air update method for continuous delta of an ANDROID operating system of a handheld device according to claim 2,
wherein said operating of the array pointer to process the array variables comprises setting the array pointer to 0, closing the command document;

executing update commands in a corresponding array variable corresponded by the array pointer, and then adding 1 to the array pointer;

and after that judging if the array pointer indicates an end of array;

said saving of row's processing progress in the update information of the MISC zone of the ANDROID operating system comprises recording a corresponding updating command string saved by the corresponding array variable in the update information of the MISC zone of the ANDROID operating system.

6. The over-the-air update method for continuous delta of an ANDROID operating system of a handheld device according to claim 3, wherein said operating of the array pointer to process the array variables comprises setting the array pointer to 0, closing the command document; executing update commands in a corresponding array variable corresponded by the array pointer, and then adding 1 to the array pointer; and after that judging if the array pointer indicates an end of array; said saving of row's processing progress in the update information of the MISC zone of the ANDROID operating system comprises recording a corresponding updating command string saved by the corresponding array variable in the update information of the MISC zone of the ANDROID operating system.

7. The over-the-air update method for continuous delta of an ANDROID operating system of a handheld device according to claim 5; wherein after judging if the array pointer indicates an end of array, proceeding to record the corresponding updating command string saved by the corresponding array variable in the update information of the MISC zone of the ANDROID operating system and then repeat the steps contained after closing of the command document when the array pointer does not indicate an end of array, or directly proceeding to step 5 when the array pointer indicates an end of array.

8. The over-the-air update method for continuous delta of an ANDROID operating system of a handheld device according to claim 6; wherein after judging if the array pointer indicates an end of array, proceeding to record the corresponding updating command string saved by the corresponding array variable in the update information of the MISC zone of the ANDROID operating system and then repeat the steps contained after closing of the command document when the array pointer does not indicate an end of array, or directly proceeding to step 5 when the array pointer indicates an end of array.

* * * * *